April 29, 1952  R. I. WARD  2,594,371

DIFFERENTIAL PROTECTIVE RELAYING SYSTEM

Filed June 14, 1946  6 Sheets-Sheet 1

Inventor.
Robert I. Ward
By Brown, Jackson, Boettcher & Dienner
Attys

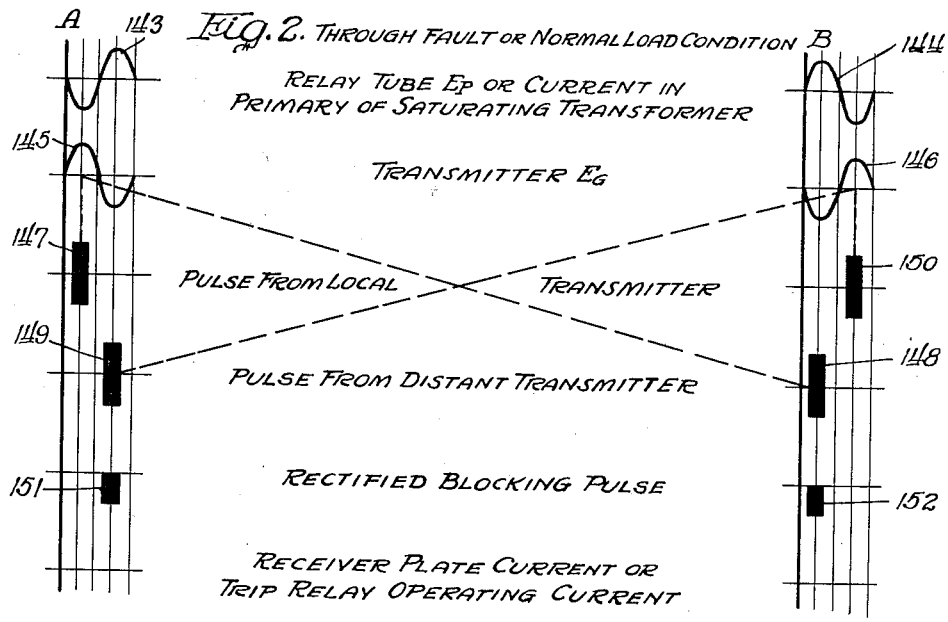
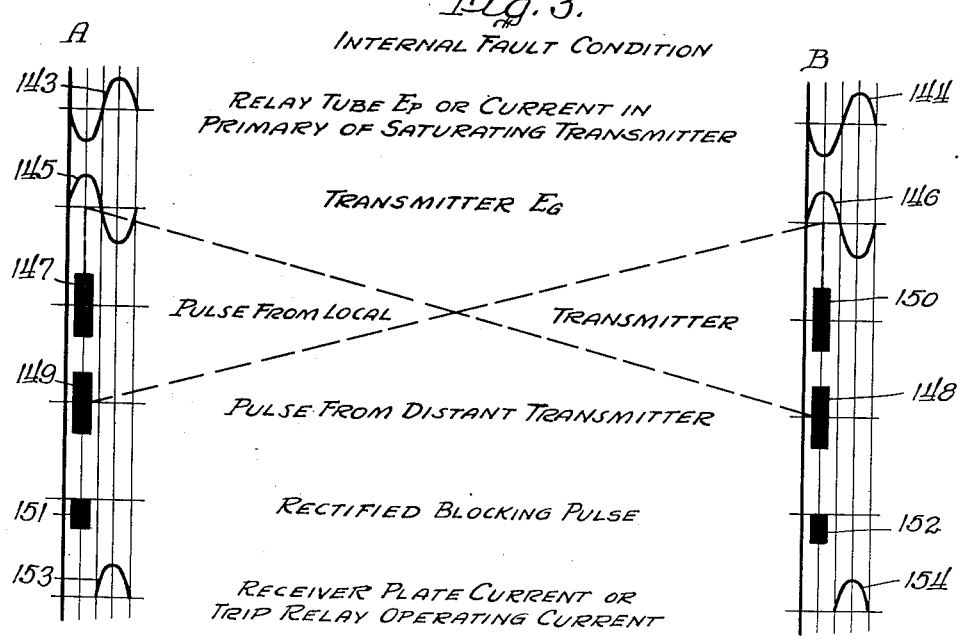

April 29, 1952 R. I. WARD 2,594,371
DIFFERENTIAL PROTECTIVE RELAYING SYSTEM
Filed June 14, 1946 6 Sheets-Sheet 6

Inventor.
Robert I. Ward
By Brown, Jackson, Boettcher & Dienner
Attys.

Patented Apr. 29, 1952

2,594,371

UNITED STATES PATENT OFFICE 2,594,371

DIFFERENTIAL PROTECTIVE RELAYING SYSTEM

Robert I. Ward, Itasca, Ill.

Application June 14, 1946, Serial No. 676,605

12 Claims. (Cl. 175—294)

My invention relates, generally, to relaying systems and it has particular relation to differential relaying systems for alternating current electric power transmission lines in which the control from the opposite ends is effected by carrier current.

My present invention constitutes an improvement over and a further development of the differential protection means disclosed in my Patent No. 2,213,294, which is a division of my Patent No. 2,147,781. In these patents I have shown how differential protection can be provided for an alternating current electric power transmission lines by employing electric valves, one at each end of the line and controlling the conductivity of the valve at each end by certain conditions at the other end of the line. The connecting link between the two ends of the line for control purposes was provided by pilot conductors which provide a direct electrical interconnection over metallic paths.

In many instances it may not be feasible to provide pilot conductors for interconnecting the stations at the opposite ends of the line. The line may be of such length that the provision of the pilot conductors for differential relaying constitutes an expense which is not warranted. There is always the possibility that the pilot conductors may be affected in such manner as to cause a false operation of the relaying system under conditions where no fault exists on the line which require that it be taken out of service.

Accordingly, an important object of my invention is to provide for controlling the circuit breaker tripping means at the ends of an electric power transmission line through differential action but without employing pilot conductors or the like between the ends of the line in addition to the line conductors themselves.

Another object is to employ carrier current for the purpose of providing the necessary connecting link between the relays at the ends of the transmission line.

Another object is to transmit continuously or intermittently from each end of the line so that, after the occurrence of an internal fault, action is initiated to disconnect both ends of the line promptly upon the occurrence of the fault, i. e. within from 1 to 1½ cycles of 60 cycle alternating current.

It is also an object to block the operation of the circuit breaker tripping means at each end of the line by impulses transmitted from the other end of the line during through fault or normal load conditions and to unblock the circuit breaker trip means immediately upon the occurrence of an internal fault condition on the transmission line.

A still further object is to measure at each end of the line the strength of the signal transmitted from the other end.

Other objects of my invention will, in part, be obvious and in part appear hereinafter.

My invention is disclosed in the embodiment thereof shown in the accompanying drawings and it comprises the features of construction, combination of elements and arrangement of parts which will be exemplified in the construction hereinafter set forth and the scope of the application of which will be indicated in the appended claims.

For a more complete understanding of the nature and scope of my invention reference can be had to the following detailed description, taken in connection with the accompanying drawings, in which:

Figure 2 illustrates, graphically, the phase relationship between the currents and voltages at opposite ends of the line and the pulses transmitted by the transmitters during through fault or normal load conditions;

Figure 3 illustrates, graphically, the relationship referred to in Figure 2 on the occurrence of an internal fault.

Figure 1:
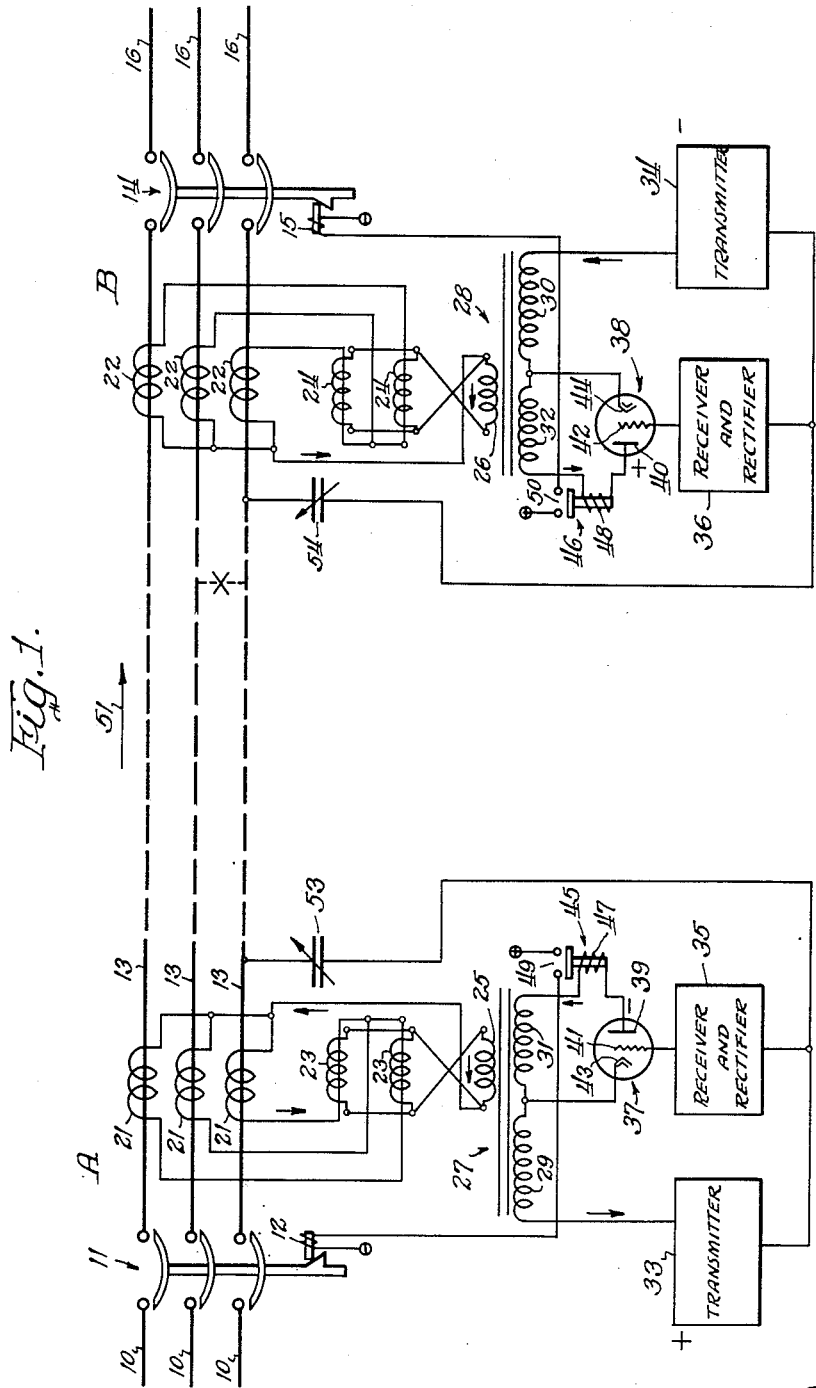
Figure 1 illustrates, schematically, the important features of my invention.
Figure 4:
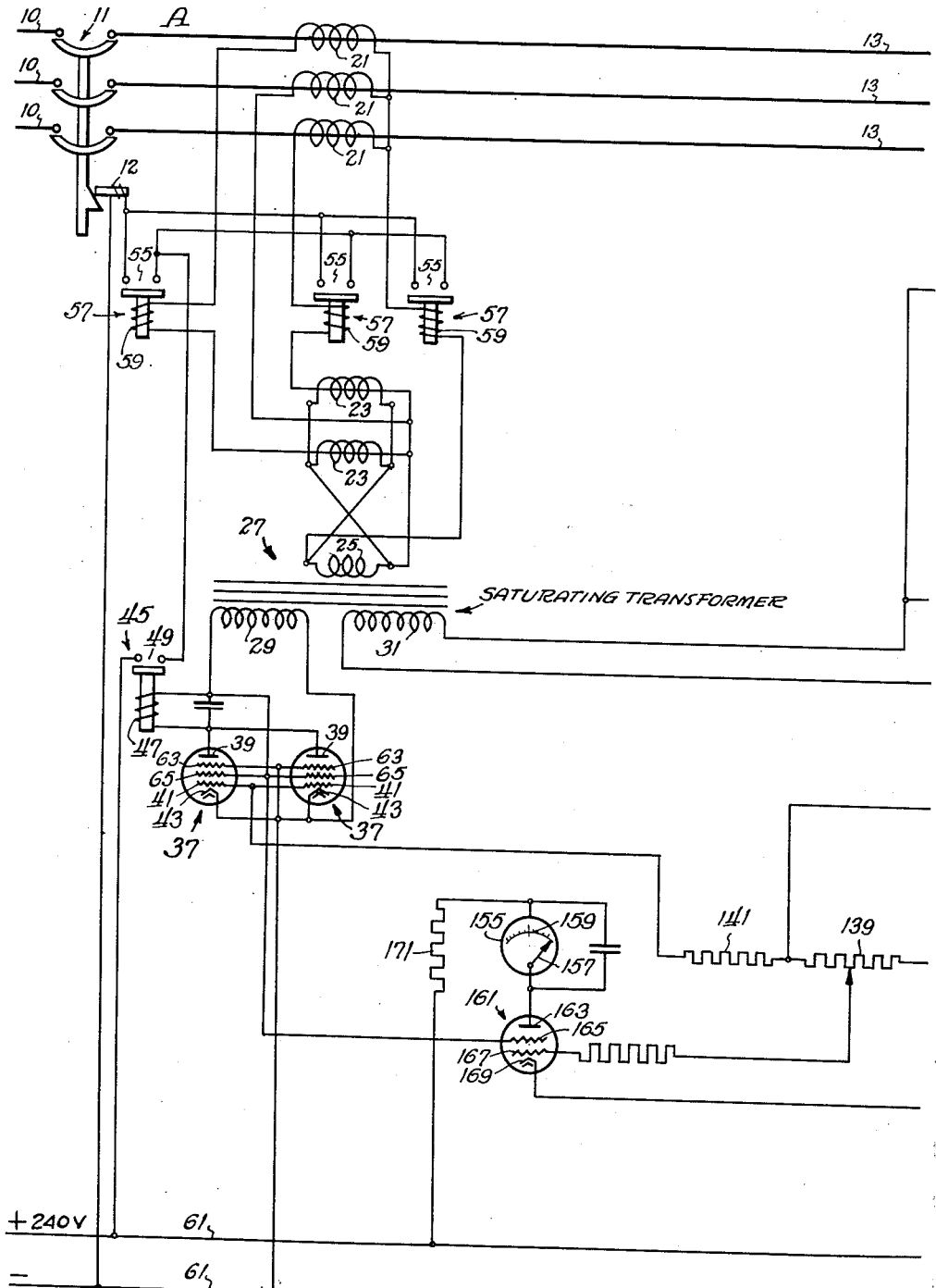
Figures 4, 5, 6 and 7, placed side by side in the order mentioned, illustrate diagrammatically the circuit connections that may be used in practicing my invention.
Figure 5:
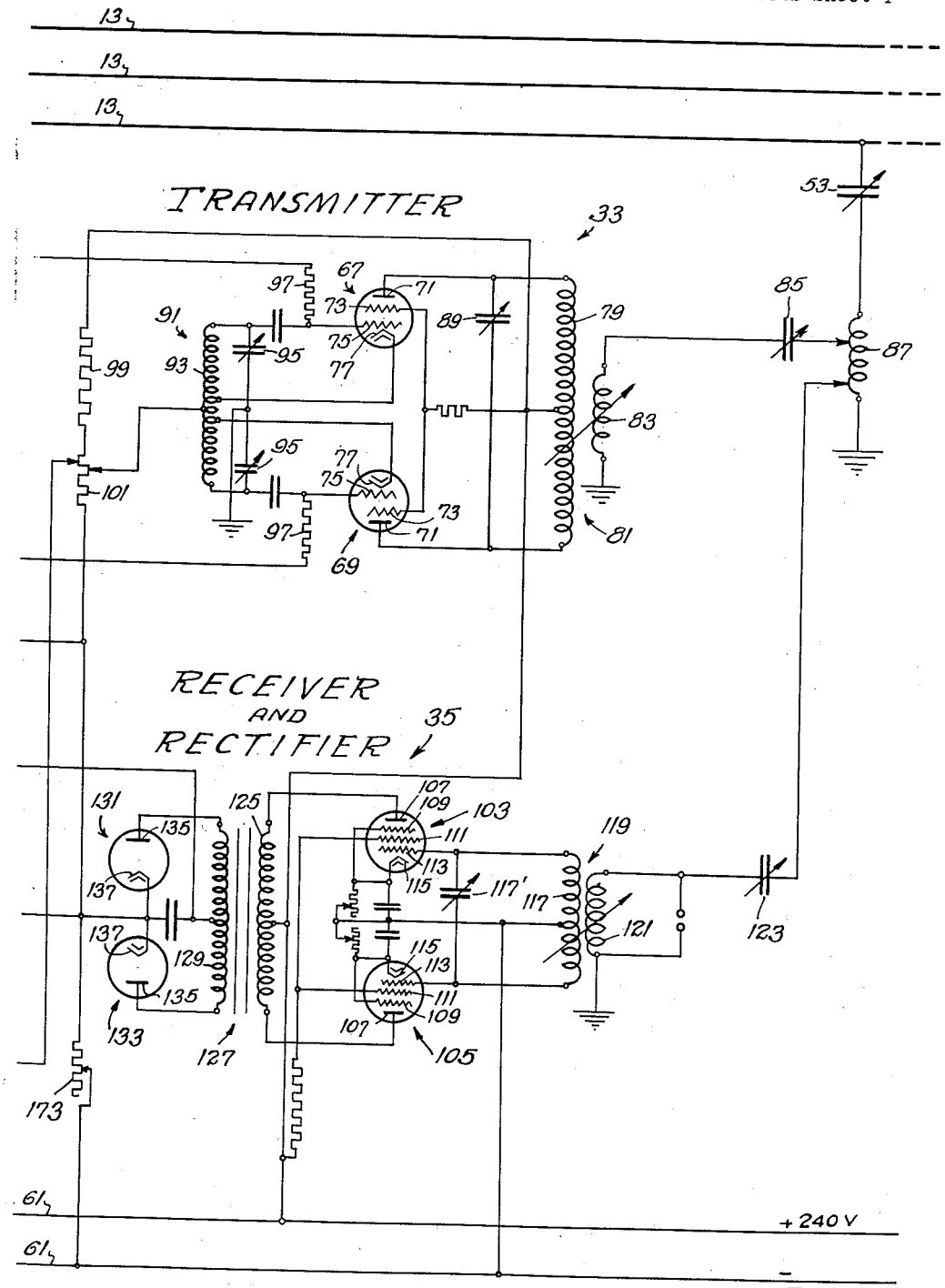
Figure 6:
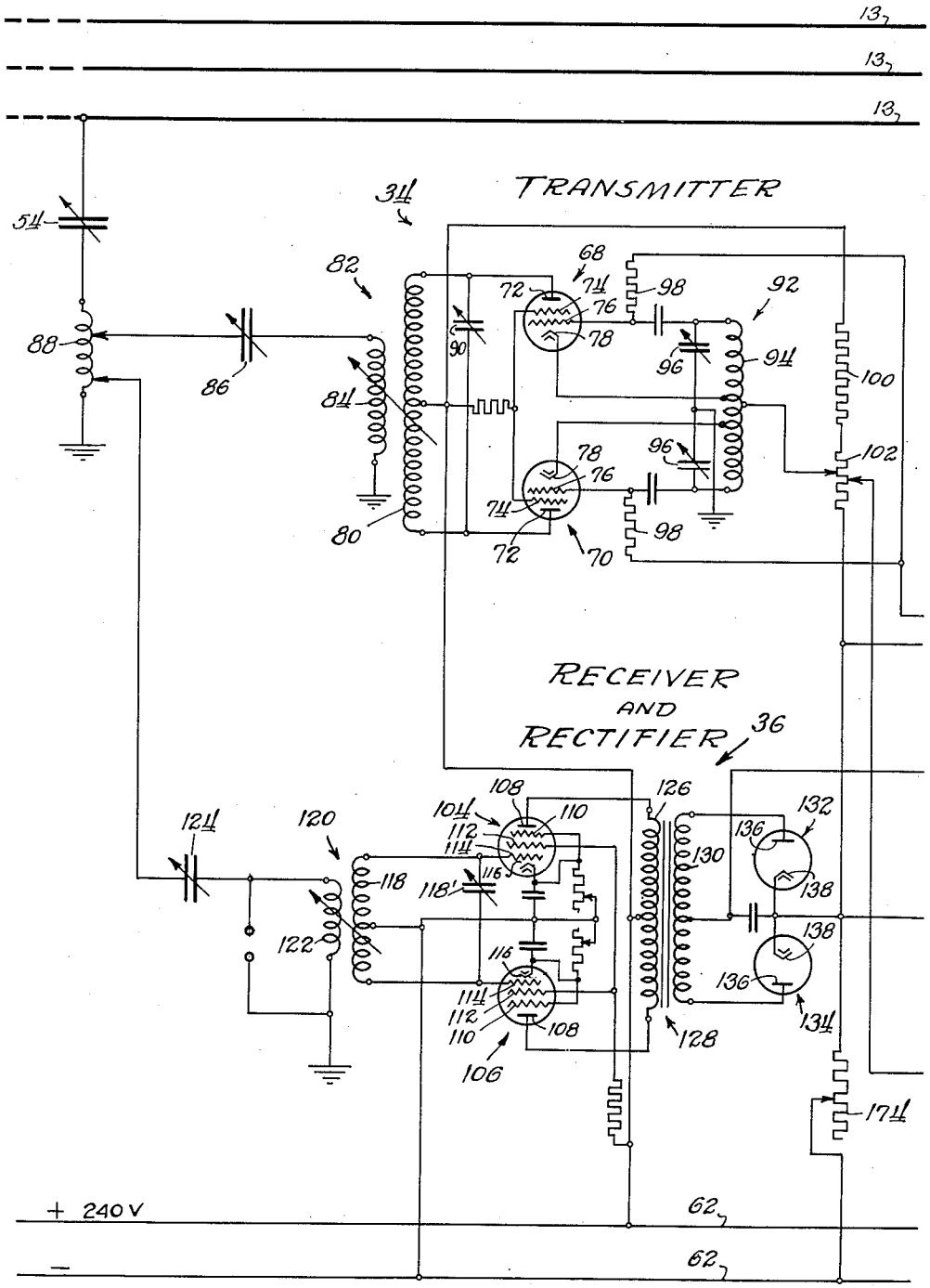
Figure 7:
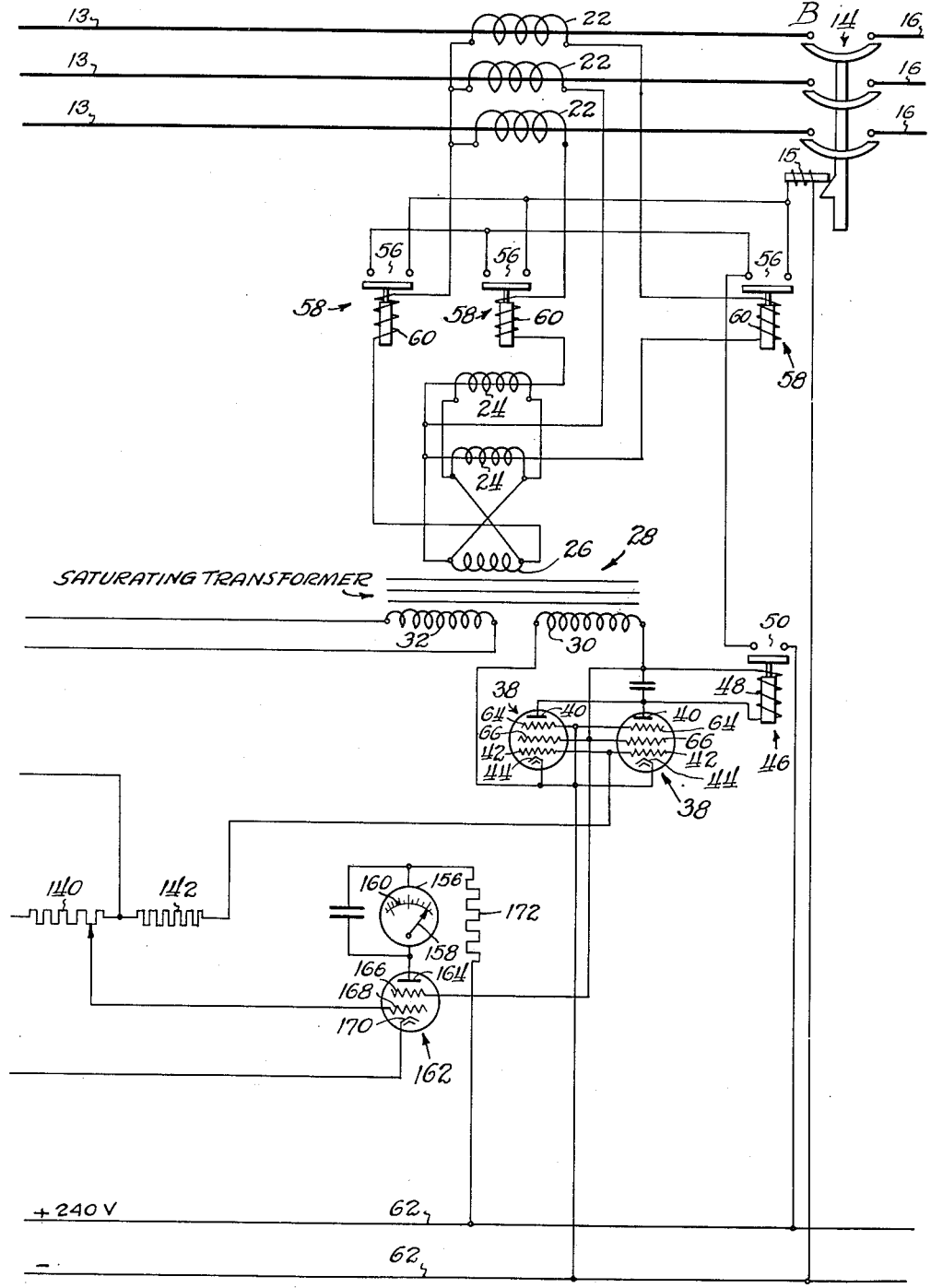

Referring now particularly to Figure 1 of the drawings, it will be observed that the reference character 10 designates conductors of a three phase system which may be supplied from a suitable source of alternating current, such as a 60 cycle source. The conductors 10 are arranged to be connected by a circuit breaker, indicated generally at 11 and having a trip winding 12, to energize an alternating current polyphase transmission line comprising conductors 13. As indicated by the broken lines, the conductors 13 are of indefinite lengths, for example, they may extend over several miles and even into the hundreds of miles. The conductors 13 are arranged to be connected by a circuit breaker, shown generally at 14 and having a trip winding 15, to conductors 16. The conductors 16 may be connected to another source of power or they may be connected to various load circuits or they may be connected to a combination of a power source and load circuits. It will be observed that the ends of the alternating current transmission line comprising the conductors 13 are designated as A and B.

In the event that there is an internal fault on the alternating current transmission line comprising the conductors 13, such as a short circuit between two of the conductors as indicated at X, it is desired that both circuit breakers 11 and 14 at the ends A and B of the line be opened by operation of their respective trip windings 12 and 15. This is to prevent power being fed from the conductors 10 to the fault and likewise to prevent power being fed thereto from the conductors 16 in the event that they are connected to a power source.

It is required that means be provided for distinguishing between an internal fault, such as the short circuit at X, and a through fault which is a fault that occurs outside of the alternating current transmission line comprising the conductors 13, for example a short circuit occurring between two conductors 16. For present purposes it is desired that the relaying system be able to distinguish from through fault conditions or normal load conditions and internal fault conditions for the purpose of selectively operating the circuit breakers 11 and 14.

In accordance with my invention, I employ the variable conducting characteristics of a thermionic valve which comprises essentially a hot cathode, a plate and a control grid. When an alternating potential is applied to the plate and to the control grid, the valve remains in the non-conducting state when the voltage applied to the plate is 180° out of phase with the grid voltage, it being assumed of course that the magnitude of the voltages applied to the grid and plate are sufficient to maintain the valve in the non-conducting state. Now when this phase relationship is altered so that the voltages applied to the grid and plate are substantially in phase and are of sufficient magnitude, the valve will become conducting and current will flow in the plate circuit.

Provision is made, in accordance with my invention, to obtain a voltage at each of the ends A and B of the alternating current transmission line comprising conductors 13, which corresponds in magnitude and phase to the current flowing in the transmission line and the direction of power flow therein. This derived voltage or potential is employed for two purposes. One of these purposes is to control the potential applied to the plate of the thermionic valve associated with the corresponding end of the line. The other is to control the operation of a carrier transmitter whose output is applied in conventional manner to the transmission line for reception at the opposite end. The means for deriving the control potentials at the ends of the line are so connected that, during through fault or normal load conditions, the control potential at one end of the line is 180° out of phase with that at the other end.

At each end of the line there is provided a receiver and associated therewith is a rectifier which may be considered to be a part of the receiver. The receiver is arranged to receive, not only the output from the distant transmitter but also the output from the local transmitter. It may comprise a radio frequency amplifier and detector or rectifier. The transmitters may transmit on the same frequency. The transmitters are controlled by the derived control potential at each end so that they transmit during successive half cycles of the frequency of the alternating current applied to the line during through fault or normal load conditions. The impulse received at one end of the line from the distant station is rectified as a negative impulse or blocking pulse and it is applied to the control grid of the thermionic valve during the half cycle that the control potential applies a positive potential to its plate. As a result the valve remains non-conducting and the relay winding in the plate circuit, connected to energize the trip winding 12 or 15 of the circuit breaker 11 or 14, is not energized.

Now, on the occurrence of an internal fault, such as the short circuit as indicated at X, the derived potential at one end of the alternating current transmission line is shifted in phase. For example, it may be shifted 180° or more in phase depending upon the constants of the circuit at the time that the fault occurs. As a result of this phase shift the transmitter at that end of the line does not transmit a pulse during the half cycle that the plates of the thermionic valves are positive. As a result both valves become conducting, the relays in the plate circuits thereof are energized and the trip windings 12 and 15 are energized. The circuit breakers 11 and 14 are then opened to disconnect the line.

As illustrated diagrammatically in Figure 1 of the drawing, the out-of-phase control potentails may be obtained by current transformers having secondary windings 21 and 22 at the ends A and B, respectively, of the transmission line comprising the conductors 13. The secondary windings 21 and 22 are connected inductively and conductively with secondary windings 23 and 24, respectively, and with windings 25 and 26 which constitute the primary windings of transformers 27 and 28, the cores of which are arranged to saturate on predetermined flow of current through the windings 25 and 26 so as to limit the voltage that is generated in secondary windings 29 and 30, 31 and 32 on the transformers 27 and 28, respectively. In LeClair et al. Patent No. 1,919,231, there is set forth an explanation of the functioning of the windings 21 through 26, just referred to, and, accordingly, a more complete description of the manner in which the connections are made and the phase relationships of the current flowing therein will not be set forth. It will be understood also that suitable networks, such as sequence filters can be used to supply current for saturating transformers 27 and 28.

The ends A and B of the transmission line have associated therewith transmitters 33 and 34. In general, the transmitters 33 and 34 are of conventional construction and both are arranged to transmit at the same frequency which, for carrier current purposes is in the range from approximately 70 to 150 kilocycles. Receivers and rectifiers 35 and 36 are associated with each end of the transmission line and they are arranged to receive and rectify impulses received from the opposite or distant end of the line or transmitters 33 and 34.

The thermionic valves are indicated, generally, at 37 and 38 for each end of the line. In general, each of the valves 37 and 38 comprises, respectively, a plate 39—40, a control grid 41—42, and a hot cathode 43—44. As will appear hereinafter, a multigrid tube is used but, for purposes of simplification, the additional grids are not shown in Figure 1. Control relays, indicated generally at 45 and 46, have operation windings 47 and 48 connected to the plates 39 and 40, respectively. They have normally open contacts 49 and 50 which are arranged to energize trip windings 12 and 15.

For purposes of illustration, it will be assumed that power flows in the transmission line comprising conductors 13 from A to B, as indicated by the arrow 51. Further, it will be assumed that through fault or normal load conditions exist. Under these assumed conditions, during the half cycle of the 60 cycle alternating current that is being applied by the secondary winding 29 to control the transmitter 33, it may be assumed further that this half cycle is positive. During this half cycle the transmitter 33 applies an impulse to one of the conductors 13 and through a variable capacitor 53.

During this half cycle the conditions are such that the secondary winding 31 applies negative potential to the plate 39 of the valve 37.

At the other end of the line, during the half cycle just referred to while the transmitter 33 is transmitting, the secondary winding 30 of the transformer 28 applies negative potential to the transmitter 34 and, consequently, it does not transmit. During this same half cycle the secondary winding 32 applies a positive potential to the plate 40 of the valve 38. However, since the impulse transmitted from the transmitter 33 is received and rectified by the receiver and rectifier 36 and is applied to the control grid 42 in the form of a negative pulse, the valve 38 is effectively blocked from conducting. During the next half cycle when the transmitter 33 is not transmitting and the transmitter 34 is transmitting, the polarities previously referred to are reversed. The valve 37 is prevented from becoming conducting by the negative pulse applied to its control grid 41 which originates in the transmitter 34. Accordingly the valve 37 is maintained in the non-conducting state. Since negative potential is applied to the plate 40 during this particular half cycle, the valve 38 is rendered non-conducting. It will be noted that the transmitter 34 applies its output to one of the conductors 13 through a variable capacitor 54.

In Figures 4, 5, 6 and 7 of the drawings the circuit connections, illustrated schematically in Figure 1, are shown in detail. It will be noted that the contacts 49 and 50 of the control relays 45 and 46 are connected in series with paralleled contacts 55 and 56, respectively, of fault detecting relays, indicated, generally, at 57 and 58 which have operating windings 59 and 60. The operating windings 59 and 60 are connected, as shown, in series circuit relation with the secondary windings 21 and 22 so that on the occurrence of predetermined fault conditions operation of the relays 59 and 60 is effected. It will be noted that, on operation of the relays 45 and 46, the respective trip windings 12 and 15 are not energized unless one of the relays 57 or 58 is also operated to complete the energizing circuit. If desired, the fault detecting relays 57 and 58 may be used to start and stop the transmitters 33 and 34 so that intermittent rather than continuous operation thereof is afforded.

Any suitable source of control voltage can be used, not only for energizing the trip windings 12 and 15, but also for applying the necessary control potentials for the various thermionic valves that are used. As illustrated, at end A conductors 61 represent the conductors of a 240 volt direct current bus. Likewise at end B conductors 62 represent a similar bus.

Each of the thermionic valves 37 and 38 has a duplicate valve connected in parallel circuit relation therewith. The reason for this is to prevent any impairment in the operation of the system should one of the valves 37 or 38 fail for any reason. It will be noted that each of the valves 37 and 38 is provided, respectively, with a suppressor grid 63—64 and a screen grid 65—66.

The transmitters 33 and 34 include electric valves 67—68 and 69—70, respectively, which are connected in push pull relation. Two valves are provided for each transmitter so that, in the event that one of them fails, the operation of the system will not be impaired. Each of the valves 67—68 and 69—70 comprises, respectively, a plate 71—72, a screen grid 73—74, a control grid 75—76, and a hot cathode 77—78. The plates 71 and 72 are connected to the ends of a secondary winding 79—80 of air core transformers 81—82, having primary windings 83—84. As shown, the primary windings 83—84 are connected through variable capacitors 85—86 to inductors 87—88 which are connected to the variable capacitors 53—54, previously referred to. Variable capacitors 89—90 are provided for the purpose of tuning the plate circuits of the valves 67—68 and 69—70.

The frequency of the transmitters 33 and 34 is controlled by oscillating circuits 91—92 which comprise, respectively, inductors 93—94 and variable capacitors 95—96. The control potential is applied to the control grids 75—76 through resistors 97—98 from secondary windings 31—32 of the saturating transformers 27—28. The necessary biasing voltages for the transmitters 33 and 34 are provided from the sources 61 and 62 through resistors 99—100 and variable resistors 101—102.

Each of the receivers comprises electric valves 103—104 and 105 and 106. They are connected in conventional manner to form dual radio frequency stages. In the event of failure of one of the valves in each receiver then the system will continue to function using the other valve alone. The valves 103—104 and 105—106 comprise, respectively, plates 107—108, suppressor grids 109—110, screen grids 111—112, control grids 113—114 and hot cathodes 115—116. The incoming signals are applied to the control grids 113 and 114 from secondary windings 117—118 of air core transformers 119—120 which have primary windings 121—122 that are connected through variable capacitors 123—124 to the variable inductors 87—88. Variable capacitors 117'—118' serve to tune the circuits to the control grids 113—114 to the desired frequency of the transmitters 33—34.

The outputs of the valves 103—105 and 104—106 are applied to primary windings 125—126, respectively, of transformers 127—128 which have center tapped secondary windings 129—130. The secondary windings 129—130 are connected to rectifier valves 131—132 and 133—134 which comprise the rectifier previously referred to. The rectifier valves 131—132 and 133—134 comprise, respectively, plates 135—136 and hot cathodes 137—138. The outputs of the rectifier tubes 131—133 and 132—134 are applied across resistors 139—140 and thereby through resistors 141—142 to control grids 41—42 of electric valves 37—38.

In Figure 2 of the drawings the operation of the differential relaying system using carrier current control as illustrated in Figures 4, 5, 6 and 7 of the drawings is shown graphically. The illustration there is for through fault or normal load conditions. Sine waves 143—144 may be taken to represent, respectively, the voltages applied to the plates 39—40 of the valves 37—38 or to represent the current flowing in the primary windings 25—26 of the transformers 27—28. It will be noted that these sine waves 143—144 are 180° out of phase with each other.

Curves 145—146 represent the voltages that are applied by the secondary windings 31—32, respectively, to the control grids 75—76 of the transmitter valves 67—69 and 68—70. For illustrative purposes the curves 145—146 are shown as sine waves. However, the wave form will be distorted under fault conditions resulting from saturation of the cores of transformers 27 and 28. It will be noted that these waves 145—146 also are 180° out of phase with each other under the conditions assumed. Since the transmitters 33—34 can transmit only when their control grids are positive, during the first half cycle of the alternating current here under consideration the transmitter 33 is transmitting while the transmitter 34 is not. This results in a pulse 147 being applied by the transmitter 33 to its receiver and rectifier 35 and a similar pulse 148 being applied to the distant receiver and rectifier 36. During the next half cycle the transmitter 33 does not function while the transmitter 34 transmits. It transmits a pulse 149 to the opposite end of the line and a local pulse 150 which is received by its receiver and rectifier 36. It will be understood that the pulses 147—148 in reality constitute a single pulse and that each is made up of a number of waves of the carrier frequency. They are shown separately for illustrative purposes. The same comment applied to the pulses 149—150 from the transmitter 34. The pulses 149—148 are rectified by the rectifier tubes 131—133 and 132—134 respectively. The rectified blocking pulses are indicated at 151 and 152 for each end of the line.

Now it will be observed that, during the half cycle that the transmitter 33 is transmitting, a rectified blocking pulse 152 is applied to the control grids 42 of the valves 38. During this half cycle, as illustrated in Figure 1, the plates 40 of these valves are positive. However, because of the negative blocking pulse 152 being applied thereto during this half cycle, the valves 38 are rendered non-conducting. Also, during this half cycle, since the plates 39 of the valves 37 are negative, they are not rendered conductive. Likewise, during the next half cycle, when the plates 39 of the valves 37 are positive, the rectified blocking pulse 151 is applied to the control grids 41 and the valves 37 are effectively blocked from conducting current. During this half cycle the plates 40 of the valves 38 are negative so that these valves are maintained in the non-conducting state.

Thus, it will be apparent that, as long as through fault or normal load conditions exist, the valves 37 and 38 will be maintained in the non-conducting state and windings 47—48 of the relays 45—46 will not be energized. This is due to the fact that a negative blocking pulse is applied to the valves 37—38 from the opposite end of the line during each of the half cycles that the plates 39—40 thereof are positive.

Now reference may be had to Figure 3 of the drawings to indicate what takes place on the occurrence of internal fault conditions. It will be assumed that the power flow is in the direction indicated by the arrow 51 in Figure 1 and that the internal fault is represented by a short circuit between the conductors 13 as indicated at X. Under these assumed conditions the sine waves 143—144, instead of being out of phase with each other as indicated in Figure 2, are brought into phase with each other as indicated in Figure 3. Likewise, the voltages represented by the sine waves 145—146 applied to the transmitters 33—34 are in phase with each other. The transmitter 34 transmits during the same half cycle that the transmitter 33 transmits so that both transmitters are transmitting in the half cycle that the plates 39 and 40 of the valves 37 and 38 are negative. During the next half cycle when the plates 39—40 are positive, no impulse is transmitted by either transmitter 33 or 34. Consequently the valves 37—38 are unblocked and current flows in their plate circuits as indicated by the waves 153—154 in Figure 3. The windings 47—48 of the relays 45—46 are energized and contacts 49—50 thereof are closed. Assuming further that the fault is of such character that one of each of the relays 57 and 58 is energized, the circuit for energizing the trip windings 12 and 15 will be completed through contacts 55 and 56. The circuit breakers 11 and 14 are tripped and the line is disconnected at each end from the system.

It is desirable that there be an indication of the strength of the signal that is being received from the opposite end of the line. That is, if it is desirable that indicating means be provided at the end A for indicating the strength of the signal that is being received from the transmitter 34 at end B and vice versa. When the system is arranged to transmit the carrier frequency from each end continuously, a continuous indication will be provided by the means now to be described.

For this purpose indicating instruments 155—156 of the D'Arsonval type, may be provided, each having a pointer 157—158 that is movable relative to a scale 159—160. Thermionic valves 161—162 are provided for energizing the meters 155—156. The valves have screen grids 165—166, control grids 167—168 and hot cathodes 169—170. The meters 155—156 are connected in the plate circuits of the valves 161—162 and across their respective direct current busses 61—62 through resistors 171—172, variable resistors 101—102 and additional variable resistors 173—174.

With neither of the transmitters 33 or 34 transmitting, the voltage applied to the plate circuits of the valves 161—162 is adjusted so that the pointers 157—158 have substantially a full scale deflection. Now during the half cycle that the local transmitter is transmitting, the valves 161—162 are blocked so that they are non-conducting. This is due to the relatively high negative bias applied to their screen grids 165—166. During the next half cycle the screen grids 165—166 are positive and hence render the valves 161—162 conducting. The degree that the valves 161—162 are rendered conducting depends upon the magnitude of the rectified negative blocking pulse which is applied across the resistors 139—140 by the transmitters at the opposite ends of the line. Consequently, during this half cycle the pointers 157—158 are deflected less than full scale. The meters 155—156 can be calibrated so that there will be zero deflection when the strength of the received signal is at a maximum. Therefore, the position of the pointers 157—158 between their zero positions and full scale deflections will be indicative of the strength of the individually received signal from the opposite end of the line.

It will be understood that the differential relay system using carrier current control disclosed herein may be defined as a pulse modulation system. However, it will be understood that frequency modulation or amplitude modulation can be employed instead of pulse modulation.

Since certain further changes can be made in the foregoing circuits and systems and different embodiments of the invention can be made without departing from the spirit and scope thereof, it is intended that all matter shown in the accompanying drawings and described hereinbefore shall be interpreted as illustrative and not in a limiting sense.

I claim as my invention:

1. In a protective relaying system for an alternating current polyphase transmission line having a circuit breaker at each end and tripping means for tripping said circuit breaker, the combination of protecting apparatus at each end of the line comprising a relay tube controlling said tripping means, said relay tube including a cathode, plate and control grid, a carrier-current transmitter operatively connected with said line for transmitting carrier pulses to the control grid of the relay tube at the other end of the line, a carrier-current receiver operatively connected with the line for receiving the carrier pulses from the far end of the line and applying them as negative blocking pulses to the control grid of the associated relay tube during external fault conditions on said line, and potential deriving means operatively connected with said line for supplying phase angle comparison potentials to the plate circuit of said relay tube and to said carrier-current transmitter, said potential deriving means comprising line current transformers for each of the phases, a saturating transformer having its primary connected in circuit with the secondaries of said line current transformers, a pair of unequal ratio current transformers having their primaries energized by the output of two of said line current transformers, the secondaries of said unequal ratio transformers being cross connected with the primary of said saturating transformer in boosting relation to the current flow received directly from said line current transformers, said saturating transformer having two secondary windings, one connected to the plate circuit of said relay tube and the other connected with the input side of said carrier-current transmitter, said carrier-current transmitter comprising a transmitting tube having a control grid connected with the latter secondary of said saturating transformer and having a plate circuit coupled in carrier transmitting relation with one of the conductors of said transmission line for transmitting carrier pulses over said line, said carrier-current receiver comprising a receiving tube having a control grid operatively connected to receive the carrier pulses which are carrier transmitted from the transmitter at the other end of the line, and a plate circuit operatively connected with the control grid of said relay tube, the potential deriving means at opposite ends of the line being operative under normal conditions and under through fault conditions to maintain a phase relation wherein the carrier pulses from opposite ends of the line are substantially 180° out of phase with each other and are effective to apply negative blocking pulses to the grids of the relay tubes at the other ends of the line substantially in phase with the positive polarity alternations applied to the plate circuits of said latter relay tubes whereby said latter tubes are effectively blocked against plate circuit conductivity during such normal and through fault conditions, and wherein said potential deriving means is operative under internal fault conditions to establish a phase relation wherein the carrier pulses from opposite ends of the line are placed substantially in phase with each other and out of phase with the positive polarity alternations applied to the plate circuits of said relay tubes so that said carrier pulses are no longer effective to block said relay tubes but said relay tubes become conductive for energizing said trip means to trip said circuit breakers.

2. In a protective relaying system for an alternating current polyphase transmission line having a circuit breaker at each end and tripping means for tripping said circuit breaker, the combination of protecting apparatus at each end of the line comprising a relay tube controlling said tripping means, said relay tube including a plate circuit and a control grid circuit, a carrier-current transmitter operatively connected with the line for transmitting carrier pulses to the control grid of the relay tube at the other end of the line, a carrier-current receiver operatively connected with the line for receiving the carrier pulses from the far end of the line and applying them as negative blocking pulses to the control grid of the associated relay tube during through-fault conditions on said line, and potential deriving means operatively connected for supplying phase angle comparison potentials to the plate circuit of said relay tube and to said carrier-current transmitter, said potential deriving means comprising line current transformers for each of the phases, a saturating transformer having its primary connected in circuit with the secondaries of said line current transformers, a pair of unequal ratio current transformers having their primaries energized by the output of two of said line current transformers, the secondaries of said unequal ratio transformers being cross connected with the primary of said saturating transformer in boosting relation to the current flow received directly from said line current transformers, said saturating transformer having two secondary windings, one connected to the plate circuit of said relay tube and the other connected with the input side of said carrier-current transmitter, said carrier-current transmitter comprising a pair of transmitting tubes having their control grids connected with oscillating circuits energized by the latter secondary of said saturating transformer, and having their plates connected in tuned plate circuits coupled in carrier transmitting relation with one of the conductors of said transmission line for transmitting carrier pulses over said line, said carrier-current receiver comprising a receiving tube having a control grid operatively connected to receive the carrier pulses which are transmitted from the other end of the line, a plate circuit responsive thereto, and a rectifier tube receiving the pulses from said plate circuit and converting them into negative blocking pulses for application to the control grid circuit of said relay tube, the potential deriving means at opposite ends of the line being operative under normal conditions and under through fault conditions to maintain a phase relation wherein the carrier pulses from opposite ends of the line are transmitted continuously in alternate half-cycles and are effective to apply negative blocking pulses to the grids of the relay tubes at the other ends of the line substantially in phase with the positive polarity alternations applied to the plate circuits of said latter relay tubes, whereby said latter tubes are effectively blocked against plate circuit conductivity during such normal and through fault conditions, and wherein said potential deriving means is operative under internal fault conditions to establish a phase relation wherein the carrier pulses from opposite ends of the line are transmitted in the same half-cycle and are substantially out of phase with the positive polarity alternations applied to the plate circuits of said relay tubes so that said carrier pulses are no longer effective to block said relay tubes but said latter tubes become conductive for energizing said trip means to trip said circuit breakers.

3. In a protective relaying system for an alternating current polyphase transmission line having a circuit breaker at each end and tripping means for tripping said circuit breaker, the combination of protecting apparatus at each end of the line comprising a pair of relay tubes controlling said tripping means, each of said relay tubes including a plate and control grid, a carrier-current transmitter operatively connected for transmitting carrier pulses to the control grids of the relay tubes at the other end of the line, a carrier-current receiver operatively connected for receiving the carrier pulses from the far end of the line and applying them as negative blocking pulses to the control grids of the associated relay tubes during through-fault conditions on said line, and potential deriving means operatively connected for supplying phase angle comparison potentials to the plate circuits of said relay tubes and to said carrier-current transmitter, each carrier-current transmitter comprising a pair of tetrode tubes connected in push-pull relation, oscillating circuits connected with the control grids of said tubes, said oscillating circuits being connected with said potential deriving means, tuned plate circuits connected with the plates and screen grids of said tetrode tubes, and means inductively coupling said tuned plate circuits in carrier transmitting relation with one of the conductors of said transmission line for transmitting carrier pulses over said line, each carrier-current receiver comprising a pair of multi-grid tubes connected to form dual radio frequency stages, said tubes having control grids connected in tuned input circuits inductively coupled to receive the carrier pulses which are transmitted from the other end of the line, said latter tubes also having secondary grids which are connected to the associated carrier-current transmitter, a transformer having its primary connected with the plate circuits of said latter tubes, and a pair of rectifier tubes connected with the secondary of said transformer and operative to convert said carrier pulses into negative blocking pulses for application to the control grids of said relay tubes, the potential deriving means at opposite ends of the line being operative under normal conditions and under through fault conditions to maintain a phase relation wherein the carrier pulses from opposite ends of the line are transmitted continuously in alternate half-cycles and are effective to apply negative blocking pulses to the grids of the relay tubes at the other ends of the line substantially in phase with the positive polarity alternations applied to the plate circuits of said latter relay tubes, whereby said latter tubes are effectively blocked against plate circuit conductivity during such normal and through fault conditions, and wherein said potential deriving means is operative under internal fault conditions to establish a phase relation wherein the carrier pulses from opposite ends of the line are transmitted in the same half-cycle and are substantially out of phase with the positive polarity alternations applied to the plate circuits of said relay tubes so that said carrier pulses are no longer effective to block said relay tubes but said latter tubes become conductive for energizing said trip means to trip said circuit breakers.

4. In a protective relaying system for an alternating current polyphase transmission line having a circuit breaker at each end, and tripping means for tripping said circuit breaker, the combination of protecting apparatus at each end of the line comprising a relay tube controlling said tripping means, said relay tube including plate and grid circuits, a carrier-current transmitter operatively connected with the line for transmitting carrier pulses to the control grid circuit of the relay tube at the other end of the line, a carrier-current receiver operatively connected with the line for receiving the carrier pulses from the far end of the line and applying them as non-blocking pulses to the control grid of the associated relay tube during internal fault conditions on said line to permit plate current flow through said tube during such internal fault conditions for energizing said tripping means to trip said circuit breakers, and potential deriving means operatively connected with the line for supplying phase angle comparison potentials to the plate circuit of said relay tube and to said carrier-current transmitter, said carrier-current transmitter comprising a transmitting tube having a plate circuit coupled in carrier transmitting relation with one of the conductors of said transmission line and having a grid connected with said potential deriving means operative to modulate the carrier frequency to produce carrier pulses for transmission over said line, said carrier-current receiver comprising rectifier means for rectifying the modulated carrier pulses, and also comprising a receiving tube having a control grid operatively connected to said rectifier means to receive the rectified carrier pulses which are carrier transmitted from the other end of the line, said receiving tube having a plate circuit operatively connected with the grid circuit of said relay tube, said carrier circuit transmitters transmitting carrier pulses over said line from opposite ends thereof continuously in alternate half-cycles throughout all normal load conditions and through-fault conditions, and transmitting such carrier pulses in the same half-cycle during internal fault conditions on the line.

5. In a protective relaying system for an alternating current polyphase transmission line having a circuit breaker at each end, and tripping means for tripping said circuit breaker, the combination of protecting apparatus at each end of the line comprising a relay tube controlling said tripping means, said relay tube including plate and grid circuits, a carrier-current transmitter operatively connected with the line for transmitting carrier pulses to the control grid circuit of the relay tube at the other end of the line, a carrier-current receiver operatively connected with the line for receiving the carrier pulses from the far end of the line and applying them as negative blocking pulses to the control grid of the associated relay tube during normal load conditions on said line, and potential deriving means operatively connected with the line for supplying phase angle comparison potentials to the plate circuit of said relay tube and to said carrier-current transmitter, said carrier-current transmitter comprising a transmitting tube having a control grid connected with said potential deriving means, and having a plate circuit coupled in carrier transmitting relation with one of the conductors of said transmission line for transmitting carrier pulses over said line, said carrier-current receiver comprising a receiving tube having a control grid operatively connected to receive the carrier pulses which are carrier transmitted from the other end of the line, and having a plate circuit operatively connected with the grid circuit of said relay tube, said carrier-current transmitters transmitting carrier pulses over said line from opposite ends thereof continuously in alternate half cycles throughout all normal load conditions and through-fault conditions, and transmitting such carrier pulses in the same half cycle during internal fault conditions on the line, so that during such internal fault conditions said carrier pulses are not effective as negative blocking pulses, whereby said relay tubes become conductive for energizing said tripping means to trip said circuit breakers, and whereby said relay tubes also become conductive for energizing said tripping means to trip said circuit breakers in the event of failure of carrier current transmission independently of line fault.

6. In a protective relaying system for an alternating current polyphase transmission line having a circuit breaker at each end, and tripping means for tripping said circuit breaker, the combination of protecting apparatus at each end of the line comprising a relay tube controlling said tripping means, said relay tube including plate and grid circuits, a carrier-current transmitter operatively connected with the line for transmitting carrier pulses to the control grid circuit of the relay tube at the other end of the line, a carrier-current receiver operatively connected with the line for receiving the carrier pulses from the far end of the line and applying them as negative blocking pulses to the control grid of the associated relay tube during normal load conditions on said line, and potential deriving means operatively connected with the line for supplying phase angle comparison potentials to the plate circuit of said relay tube and to said carrier-current transmitter, said carrier-current transmitter comprising a transmitting tube having a control grid connected with said potential deriving means, and having a plate circuit coupled in carrier transmitting relation with one of the conductors of said transmission line for transmitting carrier pulses over said line, said carrier-current receiver comprising a receiving tube having a control grid operatively connected to receive the carrier pulses which are carrier transmitted from the other end of the line, and having a plate circuit operatively connected with the grid circuit of said relay tube, said carrier-current transmitters transmitting carrier pulses over said line from opposite ends thereof continuously in alternate half cycles throughout all normal load conditions and through-fault conditions, and transmitting such carrier pulses in the same half cycle during internal fault conditions on the line so that during such internal fault conditions said carrier pulses are not effective as negative blocking pulses, whereby said relay tubes become conductive for energizing said tripping means to trip said circuit breakers, and whereby said relay tubes also become conductive for energizing said tripping means to trip said circuit breakers in the event of failure of carrier current transmission independently of line fault, and means at each end of said transmission line for measuring the magnitude of the carrier pulses transmitted from the other end of the line.

7. The invention, as set forth in claim 3, wherein signal strength measuring means are provided at each end of the line controlled jointly by the negative blocking pulses from said rectifier tubes and by the derived alternating current in said relay tubes for measuring only the strength of the carrier pulses received from the other end of the line.

8. In a protective relaying system for an alternating current transmission line having a circuit breaker at each end, and tripping means for tripping said circuit breaker, the combination of protecting apparatus at each end of the line comprising an alternating current phase angle comparison tube comprising plate and grid circuits, a carrier-current transmitter operatively connected with the line for transmitting a modulated carrier frequency in the form of carrier pulses to the control grid circuit of the phase angle comparison tube at the other end of the line, a carrier-current receiver operatively connected with the line for receiving the carrier pulses from the far end of the line and including means for applying such pulses as negative pulses to the grid circuit of the associated phase angle comparison tube, potential deriving means operatively connected with the line for supplying first and second alternating current phase angle comparison potentials, means for feeding one of said alternating current comparison potentials to the plate circuit of said phase angle comparison tube, means for feeding the other of said alternating current comparison potentials to said carrier-current transmitter for modulating the carrier frequency to produce the aforesaid carrier pulses for transmission to the other end of the line, said phase angle comparison tube being normally conductive when the positive half-cycles of said alternating current comparison potential are impressed upon said plate circuit unless said carrier pulses from the other end of the line are impressed on said grid circuit in time phase with said positive half-cycles to function as negative blocking pulses, means responsive to internal fault conditions on the line for shifting the time phase of said carrier pulses so that they cannot function as blocking pulses with respect to said positive half-cycles, whereby plate current flow occurs through said phase angle comparison tube under internal fault conditions, and means thereupon responsive to plate current flow through said comparison tube for causing operation of said tripping means.

9. In a protective relay system for an alternating current transmission line having a circuit breaker at each end, and tripping means for tripping said circuit breaker, the combination of protecting apparatus at each end of the line comprising an alternating current phase angle comparison tube comprising plate and grid circuits, a carrier-current transmitter operatively connected with the line for transmitting carrier pulses to the control grid circuit of the phase angle comparison tube at the other end of the line, a carrier-current receiver operatively connected with the line for receiving the carrier pulses from the far end of the line and including means for applying such pulses as negative pulses to the grid circuit of the associated phase angle comparison tube, potential deriving means operatively connected with the line for supplying first and second alternating current phase angle comparison potentials, the relative phase angles of which depend upon conditions on said line, means for constantly feeding one of said alternating current comparison potentials to the plate circuit of said phase angle comparison tube, means for feeding the other of said alternating current comparison potentials to said carrier-current transmitter for transmission as a carrier pulse to the other end of the line, said carrier current transmitters transmitting said carrier pulses over said line from opposite ends thereof continuously in alternate half-cycles throughout all normal load conditions and through-fault conditions on the line, said phase angle comparison tube having such characteristic as to be normally conductive through its plate circuit when the positive half-cycles of said alternating current comparison potential are impressed upon said plate circuit unless said carrier pulses impressed on said grid circuits from opposite ends of the line are in said alternate half-cycles so as to be in time phase with said positive half-cycles to function as negative blocking pulses, means responsive to internal fault conditions on the line for shifting the time phase of said carrier pulses so that they are in the same half-cycle from opposite ends of the line and cannot function as blocking pulses with respect to said positive half-cycles, whereby plate current flow occurs through said phase angle comparison tube under internal fault conditions, means thereupon responsive to plate current flow through said comparison tube for causing operation of said tripping means, and means for giving an indication of the signal strength of the carrier pulses transmitted from the far end of the line without necessitating stopping the carrier pulses from the near end of the line.

10. In a protective relaying system for an alternating current polyphase transmission line having a circuit breaker at each end, and tripping means for tripping said circuit breaker, the combination of protecting apparatus at each end of the line comprising a relay tube controlling said tripping means, said relay tube including plate and grid circuits, a carrier current transmitter operatively connected with the line for transmitting carrier pulses to the control grid circuit of the relay tube at the other end of the line, a carrier current receiver operatively connected with the line and including rectifier means for receiving the carrier pulses from the far end of the line and rectifying and applying them as rectified blocking pulses to the control grid of the associated relay tube during all normal load conditions and through-fault conditions on said line to prevent plate current flow through said relay tube under such normal load and through fault conditions, and applying them as rectified non-blocking pulses to the control grid of the associated relay tube during internal fault conditions on said line to permit plate current flow through said relay tube under such internal fault conditions, and potential deriving means operatively connected with the line for supplying phase angle comparison potentials to the plate circuit of said relay tube and to said carrier current transmitter, said carrier current transmitter comprising a transmitting tube having a control grid connected with said potential deriving means, and having a plate circuit coupled in carrier transmitting relation with one of the conductors of said transmission line for transmitting carrier pulses over said line, said carrier current receiver comprising a receiving tube having a control grid operatively connected to receive the carrier pulses which are carrier transmitted from the other end of the line, and having a plate circuit operatively connected with the grid circuit of said relay tube, said carrier current transmitters transmitting carrier pulses over said line from opposite ends thereof continuously in alternate half-cycles throughout all normal load conditions and through-fault conditions, and transmitting said carrier pulses in the same half-cycle during internal fault conditions on the line.

11. In a protective relaying system for an alternating current transmission line having a circuit breaker at each end, and tripping means for tripping said circuit breaker, the combination of protecting apparatus at each end of the line comprising an alternating current phase angle comparison tube comprising plate and grid circuits, a carrier current transmitter operatively connected with the line for transmitting carrier pulses to the control grid circuit of the phase angle comparison tube at the other end of the line, a carrier current receiver operatively connected with the line for receiving the carrier pulses from the far end of the line and including means for applying such pulses as negative pulses to the grid circuit of the associated phase angle comparison tube, potential deriving means operatively connected with the line for supplying first and second alternating current phase angle comparison potentials, means for feeding one of said alternating current comparison potentials to the plate circuit of said phase angle comparison tube, and means for feeding the other of said alternating current comparison potentials to said carrier current transmitter for transmission as a carrier pulse to the other end of the line, said carrier current transmitters transmitting carrier pulses over said line from opposite ends thereof continuously in alternate half-cycles throughout all normal load conditions on the line, said phase angle comparison tube being normally conductive when the positive half-cycles of said alternating current comparison potential are impressed upon said plate circuit unless said carrier pulses impressed on said grid circuits from opposite ends of the line are in said alternate half-cycles so as to be in a time phase with said positive half-cycles to function as negative blocking pulses, whereby no plate current flow occurs through said comparison tube under normal load conditions, means responsive to internal fault conditions on the line for shifting the time phase of said carrier pulses so that they are in the same half-cycle from opposite ends of the line and cannot function as blocking pulses with respect to said positive half-cycles, whereby plate current flow occurs through said comparison tube under internal fault conditions and means thereupon responsive to plate current flow through said comparison tube for causing operation of said tripping means.

12. In a protective relaying system for an alternating current transmission line having a circuit breaker at each end, and tripping means for tripping said circuit breaker, the combination of protecting apparatus at each end of the line comprising a phase angle comparison tube having plate and grid circuits, potential deriving means operatively connected with the line for supplying an alternating current plate potential to said plate circuit at line frequency, a carrier-current transmitter for transmitting a carrier frequency over the line to the companion protecting apparatus at the other end of the line, means for modulating said carrier frequency to produce carrier pulses therein having line frequency, a carrier-current receiver for receiving such carrier pulses from the other end of the line and applying such pulses as control pulses to the grid circuit of the associated phase angle comparison tube, means responsive to said tube for controlling said tripping means, and means responsive selectively to through-faults and internal faults in the line for controlling the phase relation between the alternating current potential applied to said plate circuit and the carrier pulses applied to said grid circuit for controlling the conductivity of said phase angle comparison tube, whereby to cause operation of said tripping means in the event of an internal fault in the line, and also to cause operation of said tripping means automatically in the event of failure of carrier current transmission independently of line fault.

ROBT. I. WARD.

REFERENCES CITED

The following references are of record in the file of this patent:

UNITED STATES PATENTS

| Number | Name | Date |
|---|---|---|
| Re. 19,034 | FitzGerald | Dec. 26, 1933 |
| 1,664,225 | Robinson et al. | Mar. 27, 1928 |
| 1,873,879 | Graham | Aug. 23, 1932 |
| 1,919,231 | Le Clair et al. | July 25, 1933 |
| 1,930,333 | Bancker | Oct. 10, 1933 |
| 2,213,294 | Ward | Sept. 3, 1940 |
| 2,217,480 | Harder | Oct. 18, 1940 |
| 2,406,615 | Lensner | Aug. 27, 1946 |
| 2,406,616 | Lensner | Aug. 27, 1946 |
| 2,406,617 | Lensner | Aug. 27, 1946 |
| 2,408,868 | Mehring et al. | Oct. 8, 1946 |
| 2,419,904 | McConnell | Apr. 29, 1947 |